June 6, 1950   G. N. HARCOURT   2,510,221
APPARATUS AND METHOD FOR SOLVENT EXTRACTION
Filed Oct. 18, 1943   5 Sheets-Sheet 1

Inventor
Guy N. Harcourt
By Parker, Prochnow & Parker
Attorneys

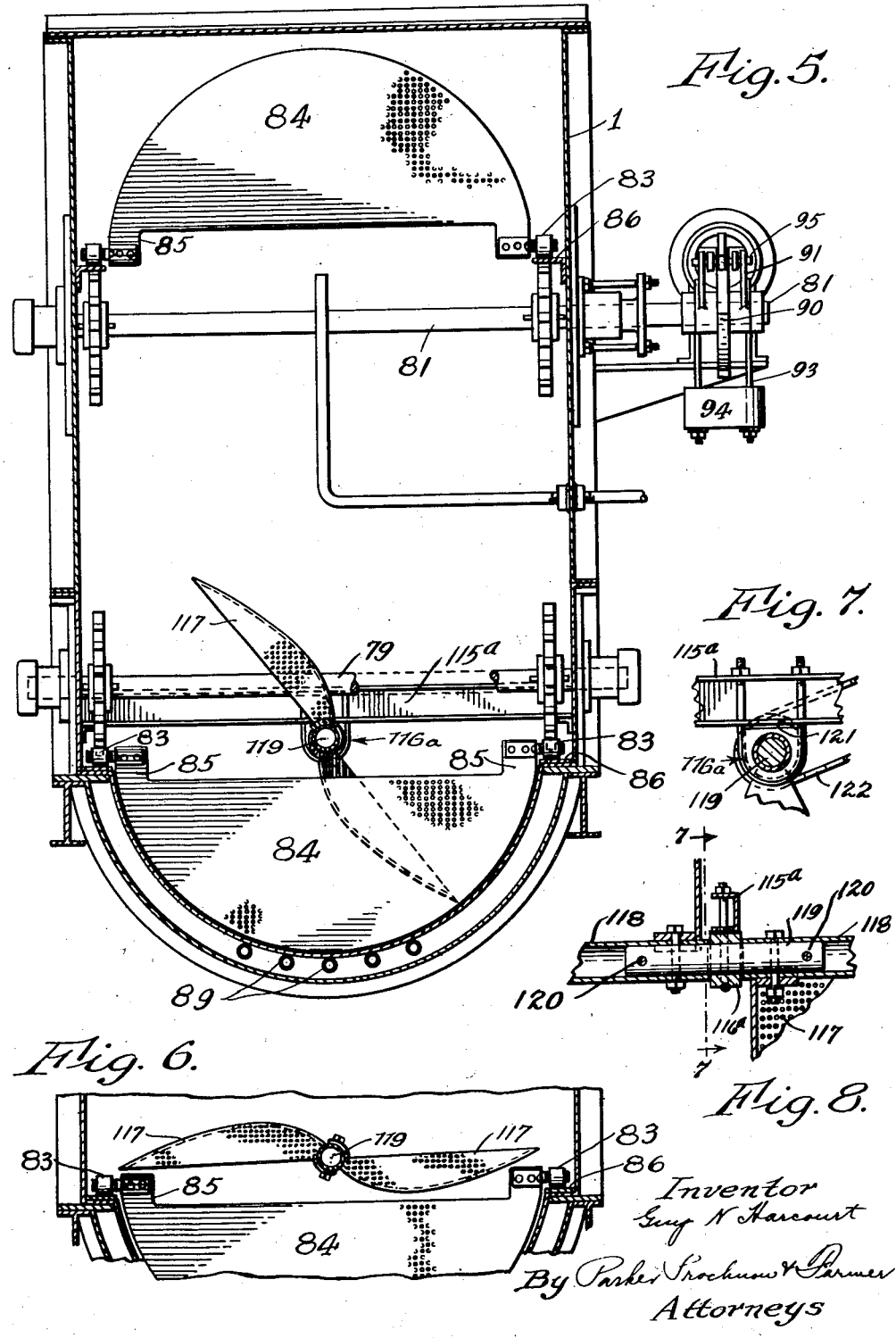

Inventor
Guy N. Harcourt
By Parker — Attorneys

Patented June 6, 1950

2,510,221

UNITED STATES PATENT OFFICE 2,510,221

APPARATUS AND METHOD FOR SOLVENT EXTRACTION

Guy N. Harcourt, Buffalo, N. Y., assignor, by mesne assignments, to Blaw-Knox Company, Pittsburgh, Pa., a corporation of New Jersey Application October 18, 1943, Serial No. 506,679

8 Claims. (Cl. 23—270)

This invention relates to solvent extraction and particularly to the treatment of solids with a suitable solvent, for the purpose of extracting from the solids a component or principle whose removal from the solids is desirable.

Solvent extraction processes are particularly useful, for example, in connection with the extraction of oils, fats and waxes from vegetable seeds, leaves, roots or tubers, in the extraction of caffeine from coffee beans, and theobromine from cocoa beans, in the extraction of oil from soya beans, and in the extraction of sugar from beets, and in the extraction of tannins or dyes from wood or bark.

Continuously operating extraction apparatus for oil bearing seeds, nuts, beans and other solids heretofore used has not been satisfactory, in that there is considerable inefficiency in the extraction. Where there has been little or no agitation of the material during the treatment by the solvent, the solvent tends to flow through the path of least resistance, and does not come in contact sufficiently and uniformly with all parts of the solid material. This results in a loss of the component to be removed, which remains in the residue, the use of excessive amounts of the solvent which dilutes the extract, and an uneven extraction. In other words, where the flow of solvent through the mass is uneven, the extraction varies in accordance with this unevenness. Therefore, there is danger either that some of the solids will be subjected to an unnecessarily long treatment or that some of the solids will not have all of the extractable component removed. In view of such unevenness, it has been considered either that the length of the extractor must be increased or that the rate of flow of the material must be reduced, which results in a reduction of the capacity of the extractor with a corresponding increase in the amount required for investment in equipment.

Extractors utilizing screws to move the solids through the extraction chamber have a tendency to move the solids toward the periphery of the screw, thereby packing the material or solids around the periphery of the screw, which makes it difficult for the solvent to flow through that part of the mass of solids, and tends to leave an open channel near the shaft or axis of the screw through which part of the solvent passes with insufficient contact with the solids. Efforts have been made to eliminate the unevenness of extraction by providing screw elements in the chamber only at intervals, so that there will be less packing at the periphery of the screw, and by providing, on the screw shaft, radial arms which are intended to stir the mass of the solids in the zones between the screw elements. These are unsatisfactory for the reasons that the stirring arms move only when the screw moves and at the same speed as the screw, and therefore, they are limited in effectiveness to provide the necessary agitation which will prevent channeling or uneven solvent flow, and there is considerable packing at the periphery of the screw at the different screw sections.

It is also important that all the solvent be used as uniformly as possible, in order that the resultant solution may be as concentrated with extract as possible. Where the solids to be treated are of substantial size, such as coffee beans, it may not be practical to grind the beans, for the reason that after extraction, the beans must be roasted. Particularly with objects of such size, the extraction from the cells of the bean or other solid is relatively slow, depending upon the rate of diffusion of the solute from the interior of the bean or other solid to the exterior.

The solvent is generally understood to form a stagnant film on the exterior surface of the bean or solid being treated, which interferes with the rate of movement of the solvent bearing the extract from the interior of the bean or object, but by reducing the thickness of this exterior film, the rate of extraction can be materially increased. It is important, therefore, to obtain as far as possible, a maximum and uniform movement of the stream of solvent over the surface of the solid material or objects in order to reduce the thickness of stagnant film on such material. This stagnant film is generally assumed to exist in most diffusional processes in which the extraction of an active principle from a solid material is obtained by means of a solvent. Where the objects are of relatively substantial size, their rate of progress through the solvent, or of the solvent through the mass of objects or solids, cannot be too rapid, since the rate of diffusion and consequently of extraction of such larger objects is necessarily slow.

An object of this invention is to improve the apparatus used for the solvent extraction of desired components from solid particles; with which greater uniformity in the extent of extraction is obtained; with which maximum possible extraction is obtained; which will have all of the advantages of the continuous extraction system and a minimum of its disadvantages; with which the amount of solvent required for extraction is a minimum, and which will be relatively simple, practical and inexpensive.

Another object of the invention is to provide an improved solvent extraction apparatus with which the effect of channeling of the solvent in the mass under treatment will be substantially prevented; which will be equally effective in the solvent extraction treatment of seeds, beans and nuts and chips that contain either a large or a small amount of extractive principle; with which the solvent will be largely recovered for further use; and which may be used for the treatment of materials that are heavier or lighter than the solvents.

Another object of the invention is to provide an improved continuous method of solvent extraction, with which a maximum amount of solvent may be recovered for use in treating further solids; which will require a minimum of apparatus; which will produce a highly concentrated and relatively pure extract; which will require a minimum of supervision, and which will be particularly simple, effective and inexpensive.

Another object of the invention is to provide a method of removing part of the solvent from the residue by a current of hot gas or vapor, such as steam or hot air, for example, to reduce the load on the dryer.

Other objects and advantages will be apparent from the following description of one embodiment of the invention, and the novel features will be particularly pointed out hereinafter in connection with the appended claims.

In the accompanying drawings:

Fig. 5 is a transverse, sectional elevation of the same, the section being taken approximately along the line 5—5, Fig. 4;

Fig. 6 is a sectional elevation of the lower part of Fig. 5, with the stirring arms in different operative positions, such as those occupied during the increment of movement of the solids under treatment;

Fig. 7 is a sectional elevation through a portion of the apparatus for driving the stirring arms, the section being taken approximately along the line 7—7, Fig. 8;

Fig. 8 is a longitudinal, sectional elevation through a part of the support for the stirrer device;

Figure 10:
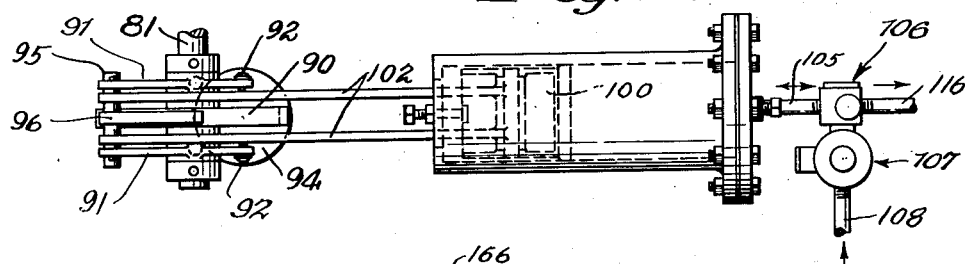
Figure 11:
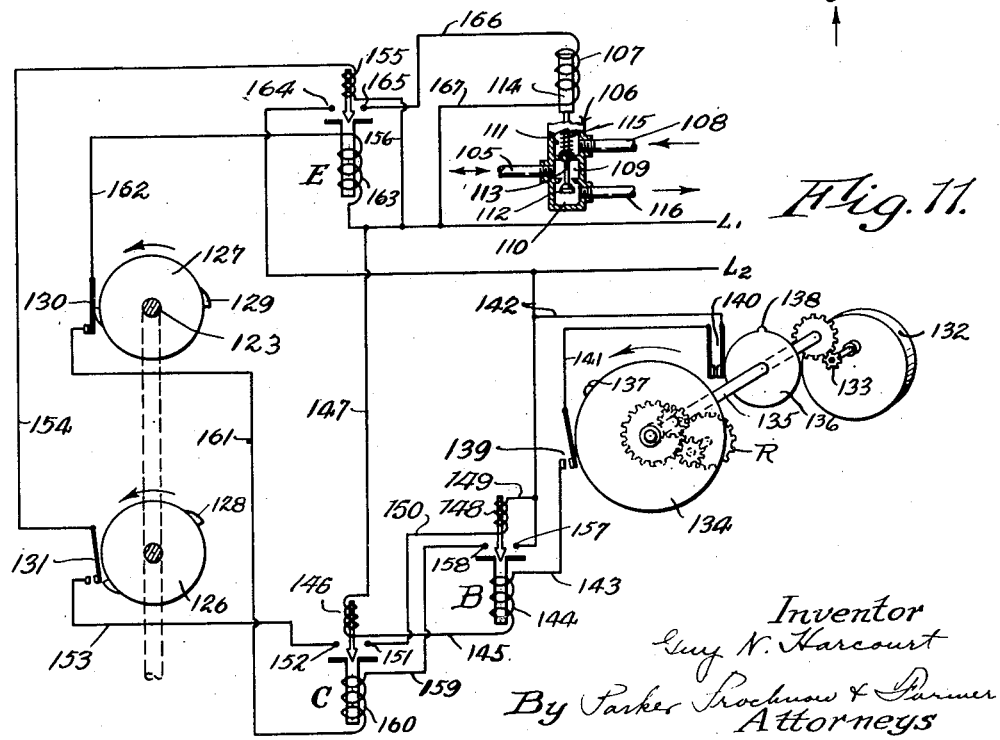

Fig. 10 is a plan of the same, but with the piston in its position at the end of a movement of the conveyor; and Fig. 11 is a wiring diagram of some controls that may be utilized to regulate and correlate the relative movements of the conveyor and the stirring arms, with which there will be no increments of movement of the conveyor while the stirring arms are in positions in which they may collide with the vanes of the conveyor during one of the increments of movement.

Figure 1:
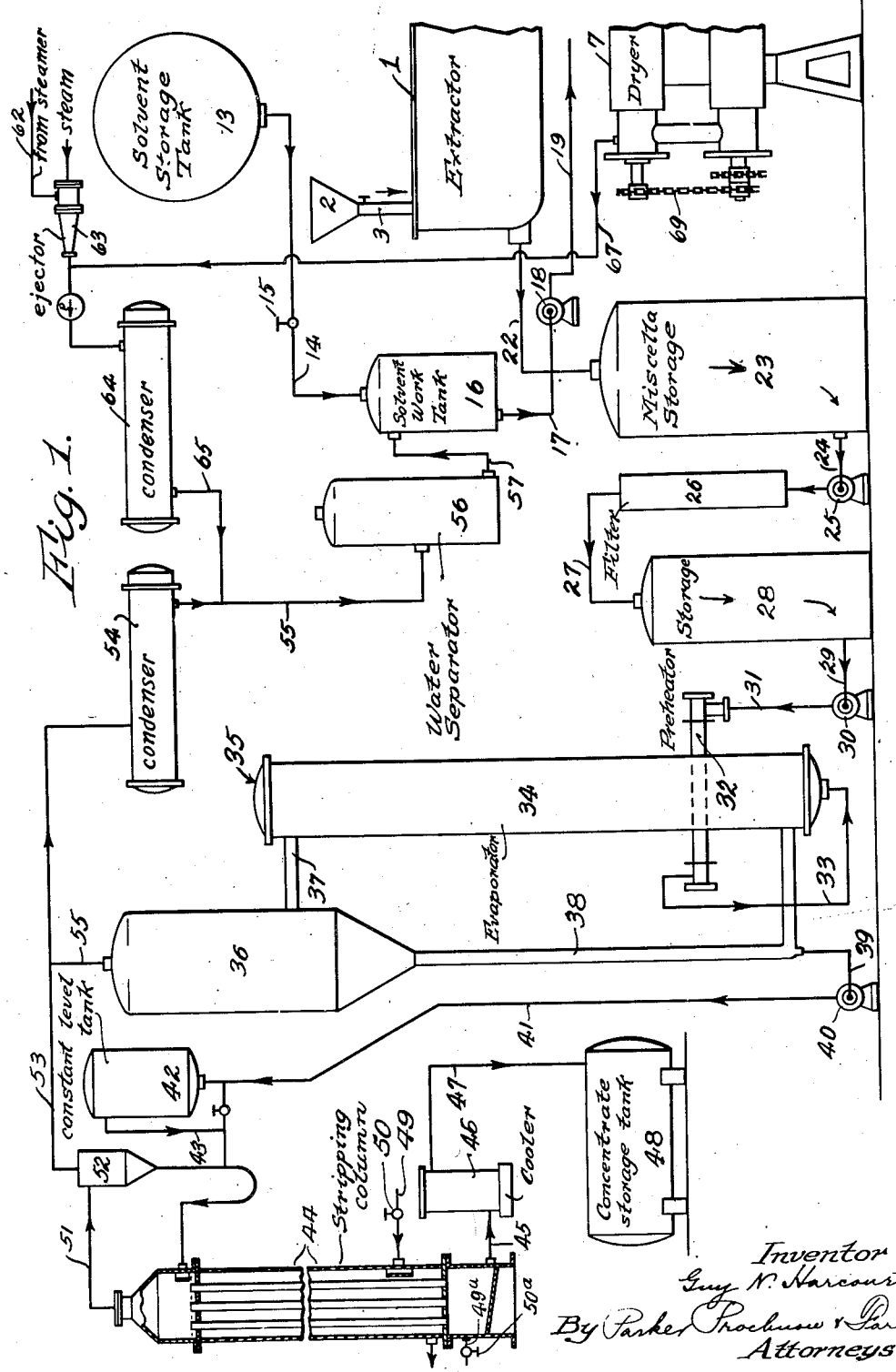
Fig. 1 is a schematic diagram of the major part of a system for the continuous solvent extraction treatment of solids in accordance with this invention.
Figure 2:
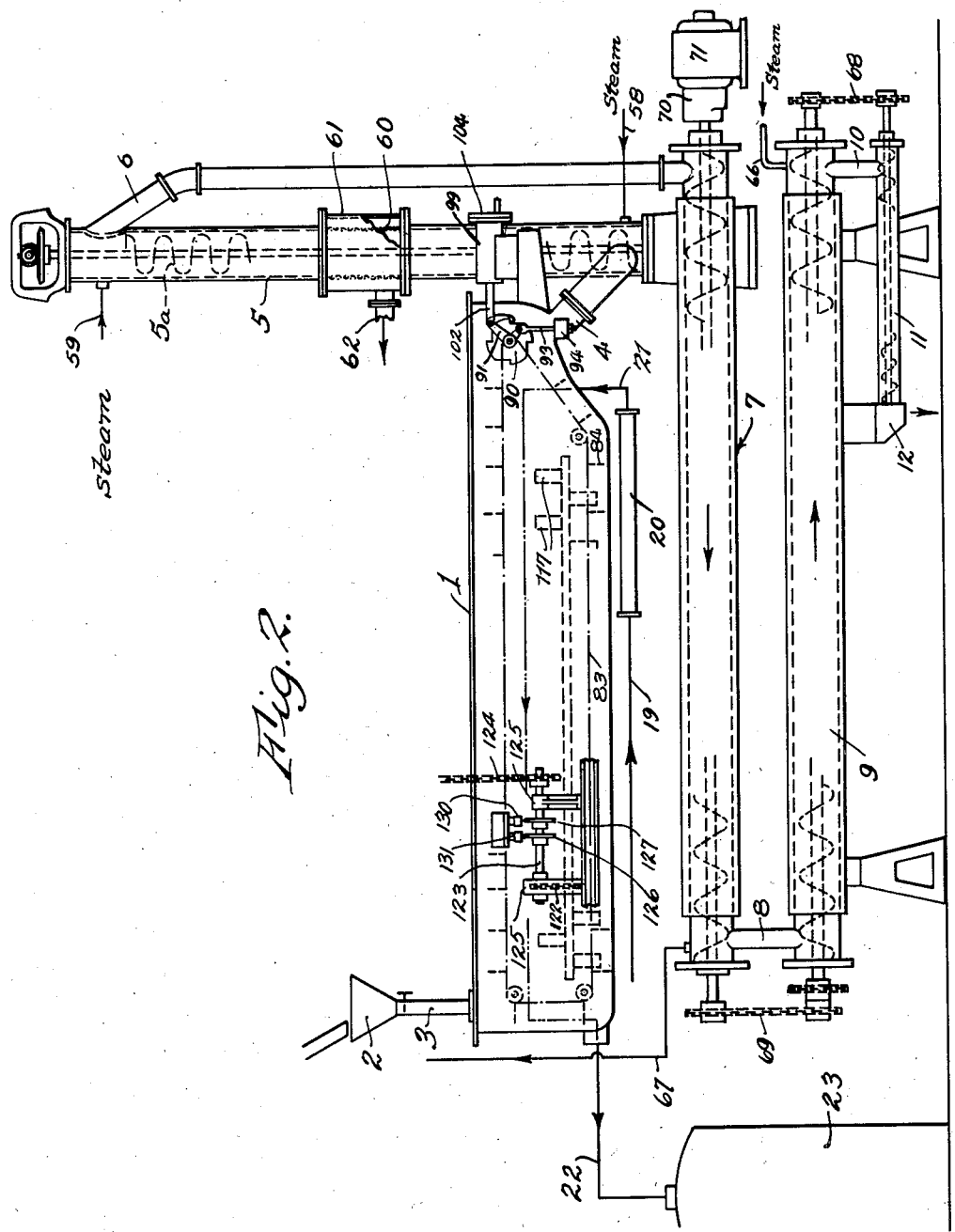
Fig. 2 is a diagram of part of the extraction apparatus and of the steamer and drier, also constructed and arranged in accordance with this invention.

Referring first particularly to Figs. 1 and 2, the illustrated example of apparatus forming the extraction system will first be described. In this embodiment of the invention, the extraction chamber is provided in a housing 1 having a hopper inlet 2 by which the solids to be treated for solvent extraction, such as beans, seeds or nuts, for example, are fed into one end of the extraction apparatus, the solids passing downwardly through a conduit 3 into the extraction chamber, as will be explained more fully hereinafter. The solids, after passing through the lower part of the housing 1, which part may be called "the extraction chamber" are discharged at the opposite end of the housing into a chute 4, Fig. 2, where the solids then pass to the lower end of an upright steamer 5 which, at its upper end, discharges into a conduit 6 leading to one end of the upper section of a two section drier 7. The upper section of the drier, at the end opposite from the connection to the conduit 6, discharges the solids into a conduit 8 which delivers them to the adjacent end of another or lower section 9 of the drier. The solids are discharged from the opposite end of the section 9 into a conduit 10 which delivers the dried solids to a conveyor seal 11, and the latter discharges the solids through an overflow hopper 12.

Fresh solvent in liquid form may be stored in a tank 13, Fig. 1, and conveyed through a pipe 14 controlled by a valve 15 to a work tank 16, where it is mixed with previously used, recovered solvent, and the mixture thereof is then delivered through a pipe 17 under the action of a pump 18 to a pipe 19 leading to a preheater 20, where the solvent is heated, if desired. The heated solvent then passes through a pipe 21 to the solids discharge end of the housing 1 where the solvent is delivered into the extraction chamber formed in the liquid-tight, lower zone of the housing. The solvent passes through the lower part of this housing in a direction generally counter to the movement of solids under treatment in that housing, and is then removed from the opposite end of the housing by a pipe 22 which leads to a miscella storage tank 23. The entrance opening into the pipe 22 is protected by a screen, see Fig. 3.

From this storage tank 23, the miscella, which is a mixture of the solvent and the extract or principle carried thereby, is withdrawn through a pipe 24, Fig. 1, by a pump 25 and passed through a filter 26 in which any finely divided solids which may be carried in suspension in the miscella are removed. The solvent with the liquid extract or principle carried thereby is then conducted from this filter by a pipe 27 to a storage tank 28, and this mixture is then withdrawn from that tank through a pipe 29 by a pump 30, which delivers it through a pipe 31 to one end of a preheater 32. The liquid mixture, after passing through this preheater 32, is conducted by a pipe 33 to one chamber 34 of a circulating evaporator 35, in which the mixture is concentrated. This type of evaporator is well known and, in addition to the chamber 34, it also has a separator dome 36 which is connected with the upper part of the chamber 34 by a pipe 37, the separator dome being also connected by a pipe 38 to the lower part of the chamber 34.

In case it is desired to remove the solvent from the extract completely and the solvent free extract is a liquid, the concentrated extract from this evaporator 35 is withdrawn from the lower part of the pipe 38, through the pipe 39 by a pump 40 which delivers the concentrated extract through a pipe 41 to a constant level tank 42. The concentrated extract overflows from this tank 42 through a pipe 43 which leads to the upper end of a downflow stripping column 44, in which the oil flows downward over the inside of a number of tubes in the form of films. These tubes are heated on the outside to furnish the necessary heat to vaporize the residual solvent. The finished extract is withdrawn from the bottom of this column 44 through a pipe 45 which conducts the extract through a cooler 46 and then the cooled extract is conducted by pipe 47 to a concentrate storage tank 48. Steam is supplied to the stripping column 44 through pipe 49 controlled by valve 50 and pipe 49a having valve 50a, and the solvent vapor carried off from the concentrated extract with the aid of the directly admitted, ascending steam in the stripping column 44 is conveyed by a pipe 51 to a separator 52 in which any entrained liquid particles are removed and returned to the pipe 43. The vapor is then conducted through a pipe 53 to a condenser 54. Vapors from the separator dome 36 of evaporator 35 may also be corducted by the pipe 55 to the pipe 53, so that the vapors from both the evaporator and separator 52 will pass through the same condenser 54.

The vapors which are condensed in the condenser 54 are then conducted by a pipe 55 to a water separator tank 56, and in that tank the water and solvent are separated by stratification into layers. The water is, of course, discarded and the condensed solvent vapors are conveyed by a pipe 57 to the solvent work tank 16, where make-up solvent is supplied from the tank 13, as previously explained.

Referring now to Fig. 2 of the drawings, a hot gas, such as live steam is admitted to the lower end of steamer housing 5 through a pipe 58, and to the upper end of the same housing by a pipe 59. A suitable elevating conveyor, such as an upstanding rotating screw 5a serves to slowly move the beans from the lower end of the housing to the top. The housing 5, intermediate of its ends, is provided with a perforate wall zone 60 which is surrounded by a closed shell or housing 61 having an outwardly extending passage 62. The steam entering the housing 5 at opposite ends thereof will pass towards the perforate zone 60 and then through housing 61 into pipe 62. The pipe 62 is connected to an ejector 63 discharging into a condenser 64, and the vapors condensed in the latter are conveyed by pipe 65 to pipe 55 leaving the other condenser 54. The ejector 63 creates a partial vacuum in the housing 61, so that steam admitted to the housing 5 will be drawn through that housing toward the perforate zone 60 and drawn off through the pipe 62 and delivered to condenser 64.

Steam or air, or both, or other suitable gas may be admitted to the discharge end of the section 9 of the drier through a pipe 66, and passed lengthwise of the section 9 to the entrance end of that section, thence through pipe 8 to the discharge end of the other drier section, where it is removed by a pipe 67 and delivered to the entrance end of the condenser 64. If desired, an ejector or vacuum pump may be included in series in the pipe 67 so as to draw the steam and air or gas through the section 9. Both sections of the drier are heated by steam jackets and the vapors driven off from the solids in the drier as well as the steam passing through the lower section 9, will be delivered to the condenser 64, and the condensed mixture then passed to the separator tank 56 where the water and solvent are separated.

The drier may be of any suitable construction, that shown by way of example being one which is suitable for this purpose, and it includes in each section therein a conveyor by which the solids are moved slowly therethrough and agitated so as to be thoroughly and uniformly heated, and air or steam passed therethrough to the pipe 67. The discharge conveyor 11 may be one which seals the outlet opening by the solids which are packed tightly therein, so that steam or gas admitted through the pipe 66 will not pass outwardly through the discharge device 11 to any appreciable extent. The conveyors in the discharge device 11 and the section 9 are connected together by a sprocket chain 68, and the conveyors of the two drier sections are similarly connected by a conveyor chain 69 running over sprockets on the ends of the conveyor shafts. The conveyor of the upper section of the drier may be operated slowly through a speed changing device 70 driven by a suitable motor 71.

Figure 3:
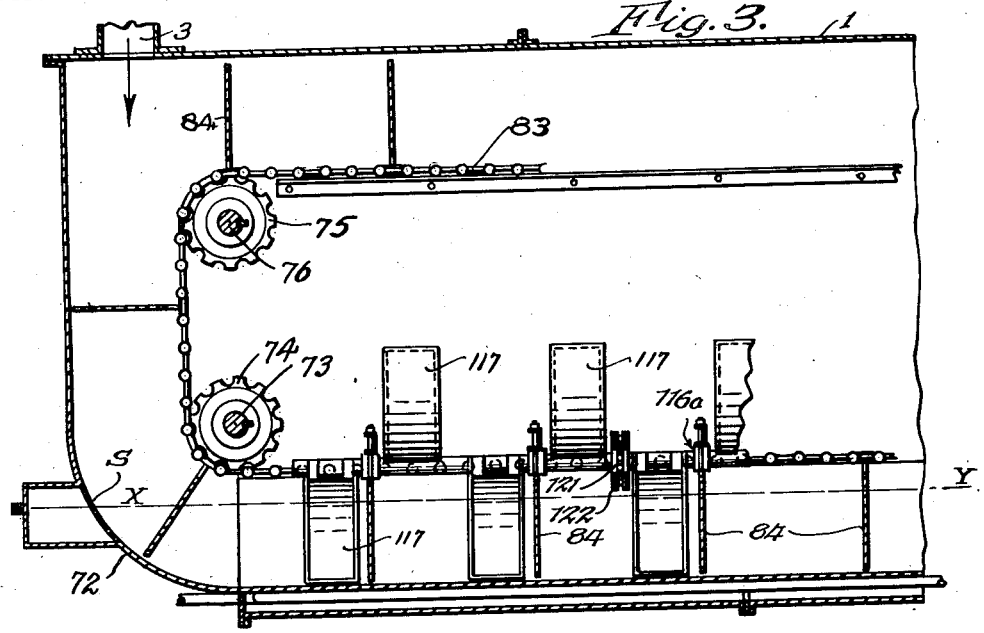
Fig. 3 is a longitudinal, sectional elevation through one end portion of the housing in which the treatment of the solids with the solvent is carried on, and which may, for convenience, be referred to as having an extraction chamber.
Figure 4:
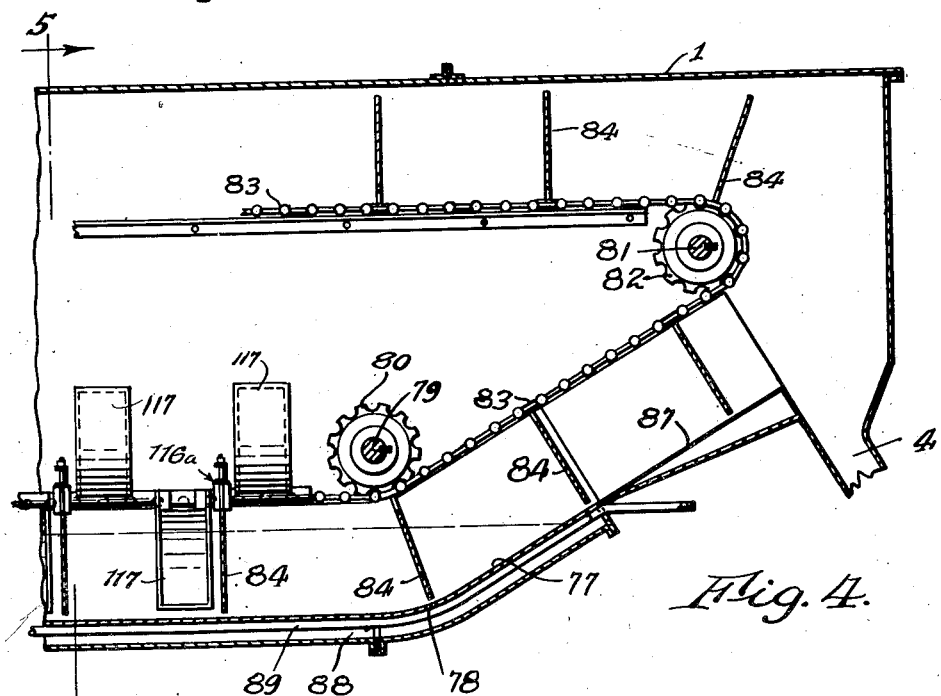
Fig. 4 is a similar sectional elevation of the other end portion of the same apparatus.
Figure 9:
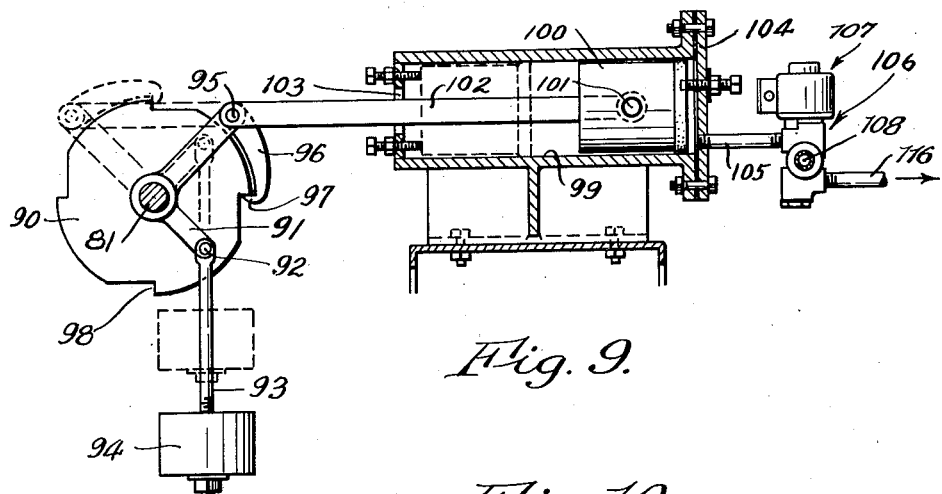
Fig. 9 is a longitudinal, sectional elevation through hydraulic operating mechanism for the endless conveyor, by which the solids are moved slowly, by increments of movement, through the extraction chamber, and with the piston in its idle position.

The extraction chamber, as explained, is enclosed in the housing 1, the two end portions thereof being shown in Figs. 3 and 4. The lower part of this housing is liquid-tight, and at one end thereof (left end in figures), the bottom is curved upwardly as at 72, with its center of curvature at the axis of a shaft 73 that extends transversely across the adjacent end of the housing at a point spaced above the bottom thereof. This shaft 73 carries a sprocket wheel 74 near each side of the housing, and a similar sprocket wheel 75 is mounted on shaft 76 disposed directly above the shaft 73 at the same end of and at each side of the housing. The bottom of the housing 1, at its other end, that is, the end opposite from the curved portion 72, is given an upward inclination 77 (Fig. 4), which is connected to the straight bottom part by a short arcuate strip 78 which has its center of curvature at the axis of a shaft 79. The shaft 79 is disposed above the bottom of the housing at the same distance thereabove as the shaft 73, extends across the housing and carries a sprocket wheel 80 adjacent each side of but within the housing.

Above the higher end of the inclined section 77 or bottom of the housing is a shaft 81 which also extends across the interior of the housing and adjacent each side of the housing carries sprocket wheels 82. Two endless chains 83 are disposed in parallel positions within the housing, one at each side thereof, each chain passing over the sprocket wheels 74, 75, 80 and 82 at its side of the housing. Rigidly attached to corresponding link portions of the chains 83 are a plurality of perforate plates or drag flights 84, spaced apart suitable uniform distances in a direction lengthwise of the stretches of the chain, and each of these plates 84 extends in a direction normal to the lengths of the chain at the points of attachment of the plate thereto, into close proximity with the sides and bottom of the lower portion of the housing, so as to move in close proximity to the side and bottom walls of the lower zone in this housing. This zone may be also referred to as the extraction chamber.

These plates 84 have very small perforations therein over the major part of their area to enable solvent to pass therethrough from one face to the other, but the perforations are small enough so that the solid particles between the plates will not pass through them. The bottom of the housing is preferably arcuate in transverse section so that the sides and bottom of the lower zone of this housing will be a segment of a circle in transverse cross section, as shown in Figs. 5 and 6. The plates 84 have upstanding ears 85 which are rigidly secured to the links of the chain 83 at each side of the housing, so that while said plates 84 are moved with the chain, they are held in planes at right angles to the lengths of the links to which they are attached. Thus, when the lower stretches of the chains move along the lower part of the housing, as on tracks 86, the plates 84 attached thereto will be held rigidly in positions to extend toward the arcuate bottom of the housing and to push along said bottom all solids that may be disposed between the plates in said extraction zone or chamber.

These plates will thus receive between them, as they pass downwardly at the left hand end of the housing, Fig. 3, the solids which are delivered thereto through conduit 3, and the batches or charges received between the vanes or plates will be pushed along the bottom to the inclined end of the housing, thence up the inclined end and over a strainer plate 87, and then into the chute 4. The bottom wall of the housing below the strainer plate 87 is spaced therefrom slightly so that any solvent carried by the solids along the inclined wall can drain off without being carried into the chute 4, except for the adherent solvent that is carried on or within the solid particles. Disposed below the arcute bottom of the housing is a heating chamber 88 in which steam coils 89 are disposed in contact with the bottom wall, so that heat can be conveyed to the solids within the compartments formed between the plates or vanes 84 and the sides and bottom of the extraction zone or chamber. Thus, the solids and solvent in the extraction chamber may be kept warm, which accelerates the solvent extraction operation, and generally increases the solubility of the component extracted in the solvent.

The shaft 81 extends exteriorly of the casing at one side and carries a ratchet wheel 90, Figs. 2, 5, 9 and 10, which is fixed thereon. This wheel 90 is given increments of rotation in a manner which will be explained presently, and this causes increments of movement of the endless conveyor formed by the chains 83 and the vanes 84, so as to gradually move the conveyor in a direction to push the solids under treatment slowly through the extraction zone of said housing. To impart such increments of rotation to the ratchet wheel 90, the shaft 81 mounts rotatably thereon and at each side of the wheel 90, a pair of bell crank levers 91. Each of the arms of each of these bell crank levers is pivoted by a pin 92 to a rod 93 depending therefrom and passing through a supporting weight 94. The other arms of the bell crank levers 91 are connected together by a pin 95 which, intermediate of its ends, mounts a pawl 96 that has a nose 97 formed to engage with notches or teeth 98 formed in the periphery of the ratchet wheel 90.

These notches or teeth 98 are spaced equally about the periphery of the wheel, and in this particular example, four notches 98 are shown. When the bell crank levers 91 are rocked from the positions shown in Fig. 9 to the positions shown in dash lines in the same figure, which is the position shown in full lines in Fig. 10, the engagement of the ratchet pawl 96 with a tooth of the ratchet wheel 90 will result in a rotation of the wheel 90 through one-quarter of a revolution, and cause a corresponding partial revolution of the shaft 81. This advances the chain 83 through a selected distance, at the same time lifting the weight 94. When the bell cranks 91 are released the weight 94 will return them to the positions shown in full lines in Fig. 9, during which the pawl 96 rides idly over the periphery of the ratchet wheel into a position to engage behind the next tooth 98 in succession.

The bell cranks 91 may be operated in any suitable manner by any suitable source of power, but in this particular example, a hydraulic operating motor is provided. This motor includes a cylinder 99, Fig. 9, in which a piston 100 is mounted for reciprocation. Pivotally connected to a wrist pin 101 of the piston 100 are two connecting links or rods 102, which through the pinion 101, are capable of rocking movement relatively to the piston. The other ends of links 102 are pivoted on the pin 95 which mounts pawl 96. These links 102 pass loosely through an aperture 103 in an end wall of the cylinder 99. The other end of the cylinder is closed by a plate 104 through which opens a pipe 105 that supplies an operating fluid under pressure to force the piston to the left, Fig. 9. The pipe 105 leads to a three-way valve 106 which may be operated in any suitable manner, such as by an electromagnet or solenoid 107, Fig. 11. This valve 106 is connected by a pipe 108 to a source of operating fluid under pressure, which may, for example, be compressed air or any liquid under pressure.

The interior of the valve housing is subdivided by partitions into three compartments 109, 110 and 111 (Fig. 11), arranged end to end and communicating with one another by openings in said partitions. These openings have valve seats which engage with corresponding closure portions 112 and 113 of a valve element that is connected to the armature or core 114 for movement by the coil 107. A spring 115 urges the valve element in a direction to close communication between the pipe 108 and chamber 109, it being understood that the pipe 105 opens into the intermediate chamber 109. An exhaust pipe 116 is connected to the end chamber 110.

The valve element normally closes communication between the compartments or chambers 109 and 111 but connects the chambers 109 and 110. This places the pipes 105 and 116 in communication with one another and vents cylinder 99. Valves of this type are well known in the art and are available in the open market, so that further explanation thereof is unnecessary.

When the coil 107 is energized, it raises closure portions 112 and 113 and connects pipe 108 to pipe 105 and disconnects pipe 105 from exhaust pipe 116. This causes the admission of fluid under pressure to the cylinder 99, and the piston 100 is forced to the left in Fig. 9, to cause an advance of the sprocket chains and drag flights. When the coil 107 is deenergized, fluid under pressure delivered by pipe 108 is discontinued and the cylinder is vented through pipe 116, whereupon the weight 94 returns piston 100 to its right hand position in Fig. 9 and returns pawl 96 to a position to engage in the next successive notch 98 in the ratchet wheel 90. Any suitable means for controlling the solenoid 107 may be employed, but the arrangement shown in Fig. 11 will serve that purpose. In this wiring diagram of Fig. 11, the number of energizations of the coil 107 in a selected period will, of course, depend upon the rate at which the solids are to be advanced through the extraction chamber, and this rate will vary with the time required for complete extraction. For example, in the case of extraction of caffeine from coffee beans, an extraction period of forty-eight hours may be required, while for some other materials, a much shorter period, such as only one hour, might be sufficient for the extraction treatment. Apparatus for the extraction of caffein from coffee beans requires a rather long extraction chamber. For example, it may be forty-eight feet long, in which case the rate of movement of the drag flights 84 will be about one foot per hour. Accordingly, the control should operate in such a manner that the flights move only once an hour over a distance of one foot, where the flights are spaced one foot apart.

Extending across, from side to side of the housing, are a plurality of channel bars 115a, (Figs. 5-8) spaced apart along and just above the lower stretches of the chains 83. Approximately midway across the housing, these channel bars support bearings 116a which in turn rotatably support an agitator element having a plurality of agitator arms 117. These arms are preferably in the form of shallow scoops and are arranged to extend alternately from diametrically opposite sides from their axis of rotation. These arms or scoops may be perforate, with the size of the perforations small enough to hold back most of the solids, but yet allow the solvent to pass therethrough. In the particular example illustrated, the arms 117 have tubular bosses 118, see Fig. 8, which are connected at adjacent ends to one another by short shaft lengths or rods 119 which pass through the bearings 116a. Suitable members, such as pins 120, pass through the tubular bosses of the scoops and rods 119, so as to connect them together for rotation as a unit. There are, in the illustrated example, two such scoops for the space between each pair of drag flights or vanes 84, and the scoops may be constructed in pairs with the scoops or arms of each pair extending in opposite directions from the axis of rotation as shown in Fig. 3. These stirrer arms or scoops 117 rotate slowly so as to laterally displace or stir the solid particles in each batch or quantity between adjacent vanes or drag flights 84, and in the case of coffee beans, this speed or rotation may be, for example, 2 R. P. M. or one revolution in thirty seconds. Obviously, this rate may be varied extensively, depending upon what rate of stirring is desired.

Fastened on this rotating element having the scoops is a sprocket wheel 121, Fig. 7, which is driven by a sprocket chain 122 leading to a sprocket wheel on a countershaft 123, Fig. 2, which is driven by a chain 124 from any suitable source of motive power. This countershaft 123 is mounted on the side of the housing 1 in any suitable manner and is rotatably supported in bearings 125. Fixed on the shaft 123 are disks 126 and 127, which have cams or contact points 128 and 129, (Fig. 11) respectively, there being two cams 128 on the disk 126 and two cams 129 on the disk 127. The cams 129 function to close momentarily a switch 130, and similarly, the cams 128 will close momentarily a switch 131. The disks 126 and 127 are drivingly connected to the scoops 117 on a one to one ratio, and hence will rotate in timed relation thereto.

A continuously running, constant speed motor 132, (Fig. 11) is connected through a speed reduction gear train 133 to drive a contact disk 134 at a rate of approximately one revolution per hour. The disk 134 is rotatably mounted on a shaft 135, and a second contact disk 136 is fixed on shaft 135 and is driven at a different rate, such as one revolution per minute. A speed reduction train R corresponding to the dial train of a watch or clock, that is, a train which connects the hour and minute hands of a watch or clock, is connected between shaft 135 and disk 134, so that while the disk 134 makes one rotation, the disk 136 will make many more rotations, such as one per minute. The disk 134 carries a cam pin 137 and the disk 136 carries a cam pin 138. The pin 137, in passing a particular position in its rotation, will engage and operate momentarily a switch 139, and the pin 138 in passing a corresponding position will engage and forcibly close momentarily another switch 140. The two switches 139 and 140 are connected in series by a wire 141.

The other side of the switch 140 is connected by a wire 142 to a line wire $L^2$, and the other side of switch 139 is connected by a wire 143 to one end of a closing coil 144 of a latch-in relay B. Latch-in relays are available in the open market under that name, and when operated, the armature is mechanically latched in operated or closed position, and so held and released by a reset coil. For identification, such relays are marketed by Struthers Dunn, Inc., #1315 Cherry St., Philadelphia, Pa., and shown on page 21E of its catalogue E of October, 1940. The other end of the coil 144 is connected by a wire 145 to one end of a reset coil 146 of another latch-in relay C. The other end of coil 146 is connected by wire 147 to a line wire $L'$. The relay B is provided with a reset coil 148 which is connected at one end by a wire 149 to the wire 142, and at its other end by a wire 150 with a contact 151 of the relay C. The other contact 152 of that relay C is connected by a wire 153 to one side of a switch 131, the other side of that switch being connected by a wire 154 to one end of a reset coil 155 of a latch-in relay E. The other end of reset coil 155 is connected by wire 156 to line wire $L'$.

The relay B has two contacts 157 and 158. Contact 157 is connected to wire 142 and contact 158 is connected by a wire 159 to one end of the closing coil 160 of the relay C. The other end of coil 160 is connected by wire 161 to one side of a switch 130, the other side of switch 130 being connected by wire 162 to one end of a closing coil 163 of the relay E. The other end of coil 163 is connected by wire to the line wire $L'$. The relay E has a pair of relay contacts 164 and 165. The contact 165 is connected by a wire 166 to one end of the solenoid or electromagnet 107 of the valve 106. The other end of the coil 107 is connected by wire 167 to line wire $L'$. The contact 164 is connected to line wire $L^2$.

The disks 134 and 136 with their ratio of rates of revolution and operated at a constant speed by a continuously running motor 132 constitute what may be called, for convenience, a timer for closing switches 139 and 140. These switches 139 and 140 are both closed at the same time momentarily once for every revolution of the disk 134, which period may be the desired frequency of increments of movement of the drag flights or vanes in the extraction chamber. The disk 136, by reason of its rotation at the more rapid rate will close the switch 140 once for each rotation thereof, but unless the switch 139 is also closed at the same time by the cam 137, no change in the circuit arrangements will occur. Since the disk 134 is rotating relatively slowly, and only a momentary contact or contact of short duration is desired for the circuit, including the switch 139, the circuit will not be closed except for the shorter period while cam 138 closes switch 140 in passing the same at a more rapid rate.

When switches 139 and 140 are both closed at the same time, which will be once for every hour, for example, a circuit is momentarily established as follows: from line wire L² through wire 142, switch 140, wire 141, switch 139, wire 143, energizing coil 144 of latch-in relay B, wire 145, reset coil 146 of latch-in relay C, and wire 147 to line wire L'. This energizes the closing coil of latch-in relay B. The energization of the closing coil 144 of relay B causes completion of a circuit between contacts 157 and 158, but no current can flow through this circuit so established until the disk 127 carries one of its cams 129 past the switch 130 and closes it. Since the cams 129 are 180° apart on the disk 127, and shaft 123 rotates with and at the same rate as the arms 117, the switch 130 will be closed every half revolution of the scoops. These cams 129 are so arranged on the disk 127 that the switch 130 will be closed only when the scoops are entirely at a level above and clear the drag flights or vanes in the lower stretch of the conveyor which runs through the lower part of the extraction housing.

Since the relay B is latched in closed circuit position when energized, the circuit made between the contacts 157 and 158 thereof, upon passing current through coil 144, will remain closed, and as soon thereafter as either cam 129 on disk 127 closes switch 130, a circuit will be established as follows: from line wire L² through wire 142, contacts 157 and 158, of relay B, wire 159, closing coil 160 of relay C, wire 161, switch 130, wire 162, and closing coil 163 of a latch-in relay E to line wire L'. When this circuit is closed, the relays C and E will both be closed or operated and mechanical latches keep these circuits closed. When the relay E closes, it completes a circuit as follows: from line wire L², contact 164, contact 165, wire 166, valve solenoid coil 107 and wire 167 to line wire L'. This operates the valve 106 and causes fluid under pressure to be admitted to the hydraulic motor shown in Fig. 9, which causes the piston 100 to move to the left and advance the drag flights or vanes a given increment of movement determined by the extent of movement of the shaft 81. This movement should be fairly rapid so as to require only a short interval of time, while the rotating stirrers or scoops are above the vanes or drag flights.

The disk 126 is so mounted on the shaft 123 relatively to the disk 127, that the cams 128 thereon will close the switch 131 after the piston 100 has moved its full stroke, but before the switch 130 is closed a second time by the other cam 129. The switch 131 when closed, completes another circuit, as follows: from line wire L² through wire 142, wire 149, reset coil 148 of relay B, wire 150, contacts 151 and 152, wire 153, switch 131, wire 154, reset coil 155 of relay E and wire 156 to line wire L'. The closing of this circuit energizes the reset coil in relay E, which releases the relay and causes an opening of the circuit between contacts 164 and 165 thereof. This de-energizes the coil 107 of the electromagnetically operated valve 106, allowing this valve to disconnect pipes 108 and 105, and to reconnect pipe 105 to the exhaust pipe 116. The piston 100 is then returned to its initial position by weight 94 because the operating fluid can escape from hydraulic motor to exhaust pipe 116.

When current passed through the last described circuit, it also energized the reset coil 148 in the relay B, and thus opened this relay from its mechanical latch. This opened the circuit through the closing coil 160 of the relay C and thus opened the circuit through the switch 131 before that switch could be closed a second time by one of the cams 128. This arrangement prevents an operation of the electromagnet or solenoid of the valve 106 except when disks 134 and 136 close switches 139 and 140 simultaneously, which is the time when the drag flights or vanes of the conveyor are to be operated or moved. If the disks 134 and 136 closed switches 139 and 140 and caused an operation of the relay B, and the disk 126 closed the switch 131 before the disk 127 closed the switch 130, then the relay B would open again before the flights could move, and an entire period controlled by disks 134 and 136 would pass before another movement of the flights or endless conveyor was possible. To prevent this, the relay C is provided so that when the disks 134 and 136 close the switches 139 and 140, the reset coil 146 of the relay C is energized, which opens the relay C and thus opens the circuit between the contacts 151 and 152.

If the switch 131 is closed before switch 130, no current flows through the contacts 151 and 152 of relay C, and the relay B remains closed until the switch 130 closes and the solenoid-operated valve 106 has had an opportunity to operate. As soon as the switch 130 closes, current passes through the closing coil 160 of relay C, thereby closing a circuit through the contacts 151 and 152, making this circuit ready to function when the switch 131 closes. The relay C remains closed for the full period between movements of the drag flights until the disks 134 and 136 again close switches 139 and 140. At every half revolution of the scoop unit, the switch 131 will be closed and current could flow through the circuit controlled by the contacts 151 and 152 of relay C and through the reset coils of the relays B and E if relay C was closed. Since these relays B and E are opened the first time that the switch 131 closes after movement of the flights or vanes, any such flow of current every half revolution is immaterial.

It will be understood that the method of synchronizing the movements of the agitator or scoop shaft and of the endless conveyor which moves the flights or vanes by increments, is only an illustration of one example and obviously other means for accomplishing the same result may be employed. It will also be understood that suitable safety measures may be employed to prevent damage in the event that the pressure is insufficient to operate the endless conveyor promptly within the time desired, or to stop the operation if the controls should fail, or should the endless conveyor attempt to operate when the scoops or agitator arms are in the path of the vanes or flights. Since such safety devices are separate and divisible inventions, they have not been illustrated or described.

It is believed that the operation of this apparatus will be clear from the foregoing description, but it will be briefly referred to by way of summation. Assuming that the apparatus is used for the extraction of caffein from coffee as one example of the application of this invention to industry, the raw coffee beans, unground, and either dry or previously soaked in water, are supplied to the hopper 2 and fed therefrom through chute 3 to one end of the extractor housing 1. The beans entering the housing 1 engage upon one of the vanes or flights 84 which is in the vertical stretch at that end of the housing, and then as the conveyor moves along the coffee beans supported thereon, will descend into the lower part of the housing through which the solvent for the extraction is flowing. The beans will be pushed along in individual batches or charges by increments of movement, so that the desired elapsed time will occur before the coffee beans complete their travel through the lower part of the housing and are discharged into the chute 4. At the same time, solvent recovered from the previous treatment of coffee beans will be supplemented with make-up solvent from the tank 13 and this mixture supplied by pump 18 and pipe 19 to a preheater 20, Fig. 2. The heated mixture will be delivered by pipe 21 to the lower part of the housing 1.

The solvent liquid then flows through the lower part of the housing to the screen S at the outlet opening with which the pipe 22, Fig. 3, is connected, the position of the outlet pipe 22 determining the level of the solvent in the housing 1. This level is indicated, for example, by the broken line X—Y in Fig. 3. It will be noted that the solvent and beans move in opposite directions through the extraction chamber, and that the stirring by the arms or scoops 117 causes local relative displacement of the beans in directions crosswise of the general direction of travel of the solvent through the extraction chamber. The solvent with the extractive principle carried thereby is delivered into the miscella storage tank, as previously explained, and this extract is then concentrated and stripped of the surplus solvent. The surplus solvent is then condensed and returned to the tank 16 for the treatment of further beans, that is, for recirculation through the housing 1. The beans, after the extraction treatment in the housing 1, and when discharged through the chute 4, pass to the lower end of the steamer 5, where they are carried by a screw or endless conveyor to the top thereof, and there discharged into chute 6. As the beans pass upwardly through the steamer 5, they are compacted by gravity which prevents channeling and at the same time, they are subjected first to steam admitted through the pipe 58, which steam rises with the beans to the perforate zone 60. Such steam removes most of the excess solvent which may be adhering to the beans and also tends to remove solvent from the interior of the beans by diffusion of the solvent to the exterior of the beans.

Similarly, steam entering through the pipe 59 at the top of the steamer passes downwardly through the ascending beans, and this fresh steam which engages the beans about to be discharged into the chute 6, will strip the beans almost free of solvent and carry it downwardly to the perforate zone 60. The steam coming from opposite ends of the steamer 5 will pass through the perforate zone 60 into the housing 61, thence through pipe 62 to an ejector which creates a partial vacuum in the housing 61. The steam, with the solvent vapors carried off in this manner, is then conveyed to the condenser 64, Fig. 1, and thence to water separator tank 66, after which the condensed pure solvent is returned to the tank 16 for use in the treatment of further beans. The beans discharged into the chute 6 from the steamer have very little solvent left therein, but any which is left is largely within the beans that has not been diffused outwardly during the treatment in the steamer 5. The beans thus pass through the chute or conduit 6 to the upper section of the drier 7, where they pass through a heated chamber.

The conveyors in the drier 7 are rotated by the motor 71 and the beans are gradually moved through the upper section of the drier to the left hand end thereof, then to the lower section 9, thence to the right hand end of that section, then by chute 10 to the discharge sealing device 11. During this travel of the beans in the drier, they are dried, and all vapor, moisture and solvent removed from the beans while in this drier will be conducted to the pipe 67. If desired, a small amount of steam may be admitted to the lower section of the drier so as to remove the last part of the solvent from the beans, and the vapors therefrom pass upwardly through the chute 8 and then out through the vapor removal pipe 67. It will be understood that various forms of steamers 5 and driers 7 may be employed within the principle and scope of this invention, because the details thereof are not, per se, a part of this invention, and any well known examples of apparatus found in the market may be employed in this particular system.

While the stripping column 44 may be eliminated, it is useful in many instances where the solvent-free extract is a liquid in an effort to recover as large a percentage as possible of the solvent, and to have as little solvent as possible in the concentrated extract delivered to the storage tank 48. These stripping columns 44, separators 52, constant level tanks 42 and evaporators 35 are well known apparatus which have been used in the industry for various purposes, and for that reason they have been illustrated only diagrammatically.

The counterflow treatment of the solvent and beans is continuous and slow, and it will be noted that the scoops or arms 117 make a plurality of rotations or stirring operations between successive movements of the flights or vanes 84, so that while the progress of the beans through the extraction chamber is relatively slow, there is sufficient agitation or local, lateral, relative displacement of the beans by the arms 117 to break up any tendency of the solvent to channel in its movement through the chamber. In that way, the flow of the solvent is uniform throughout the entire mass of beans as they travel in individual batches or charges through the extraction chamber or zone. Thus, all of the beans get substantially the same treatment, and the extraction is uniform and as complete as possible. Because of the slow rotation of the arms 117, the beans will not be thrown from one compartment to another. The solvent will pass from compartment to compartment through the apertures or perforations in the drag flights or vanes 84, and the coordination of the movements of arms 117 with the movements of the drag flights or vanes 84 will prevent any collision between the vanes 84 and stirring arms.

In case the solvent is lighter than water, the condensate from the condensers will flow into the water separating tank in the center and the solvent will flow from the top of this tank into the solvent work tank. When the solvent is heavier than water, it will settle to the bottom of the separating tank and will pass therefrom into the solvent work tank. This apparatus may be employed for the solvent extraction treatment of materials that are either heavier or lighter than the solvent. When used with materials that are lighter than the solvent, the agitator arms 117 will preferably revolve in directions which will have a tendency to force the material into the liquid, whereas if the materials are heavier than the solvent and collect at the bottom of the extractor, the stirring arms will be designed to lift the material from the bottom and deposit it in the upper part of the solvent stream. In the treatment of coffee, it will be understood, of course, that if desired, the beans may be first soaked in water by apparatus, not shown, before discharge into the hopper 2, in order to accelerate the entry of the solvent into the unground beans.

While specific reference has been made as a matter of convenience to the treatment of coffee beans for the extraction of caffeine therefrom, it will be understood that this is by way of example only, and that similar apparatus may be employed for the treatment of other solids as previously mentioned herein. The solvent used may vary for different materials or solids to be treated. As a matter of record, various solvents have been used for the extraction of caffeine from coffee, one such solvent being trichlorethylene, but in such case it is undesirable to use a stripper for treating the concentrated extract. The stripper is mainly used where the extractive principle is an oil or similar material. A different type of drier may advantageously be employed for the coffee beans.

If the apparatus is used for extracting tannin extract from woods, such as chestnut, hemlock, oak, spruce, etc., then water is commonly used as a solvent, and no stripper would be used for the extract. The drier would not be needed for the wood chips. The steamer is usually employed when the solids or particles to be treated are not greatly crushed or ground because the larger particles usually need extra steaming after extraction in order to get out all of the solvent. Such apparatus is also very useful for the extraction of oil from soy beans, in which case a suitable solvent could be hexane. When using soy beans, it is not necessary that the beans be passed through the extraction treatment unbroken and, in fact, the beans may be advantageously ground or flaked first.

It will be understood that various changes in the details, materials and arrangements of parts, which have been herein described and illustrated in order to explain the nature of the invention, may be made by those skilled in the art within the principle and scope of the invention as expressed in the appended claims.

I claim as my invention:

1. In apparatus for solvent extraction from solid particles, in which the particles and liquid solvent are passed in opposite directions through an extraction chamber, that improvement which comprises conveyor means bodily movable through an extraction zone of said chamber in one direction and having subdivisions for conveying said particles in separate individual charges, in succession, bodily through said chamber, means for passing a solvent through said chamber, and a plurality of stirring members arranged and spaced apart along the path of travel of said subdivisions and past which said conveyor means travels, movable in a direction crosswise of said travel of said charges, and operable to stir locally the particles of said charges in succession as the charges progress along said path.

2. Solvent extraction apparatus comprising a housing having a water-tight lower portion and with its bottom wall rising at an incline toward and adjacent one end, an endless, flexible conveyor disposed within said housing with a lower stretch disposed above and parallel to said bottom wall including said inclined portion of said bottom wall, said conveyor having perforate plates spaced apart along the same and extending normal to the direction of travel of the conveyor in said lower stretch and into close proximity to the sides and bottom walls of said housing including said inclined portion, whereby said plates on the lower stretch of said conveyor will form with the lower part of the housing a plurality of compartments arranged in succession along the lower part of said housing and up said inclined bottom portion, means for discharging particles to be treated for extraction into that end of said housing which is opposite the end with the inclined bottom whereby when said conveyor moves in a direction to carry its lower stretch toward the inclined end and along the bottom thereof, said particles will fill said compartments in succession and said filled compartments will move along the bottom of said housing and then up said inclined portion, said housing having a discharge opening at the upper end of said inclined bottom, whereby the particles may be discharged by gravity from said compartments as they reach the upper end of said inclined bottom wall, means for moving said conveyor by increments, with intervals of rest between said movements, means including stirrer members disposed above the path of travel of said plates with said lower stretch of the conveyor, movable in a direction crosswise of the direction of movement of said conveyor downwardly into and out of some of said compartments of said lower stretch and immovable in the direction of movement of said conveyor for stirring the particles in said compartments at different positions of said compartments in their travel along the bottom of said housing, means for correlating the movements of said stirring means and said conveyor to prevent collision of said stirring means and said plates, and means for passing a solvent liquid through the lower part of said housing at a level below the upper end of said inclined bottom.

3. Solvent extraction apparatus comprising a housing having a water-tight lower portion and with its bottom wall rising at an incline toward and adjacent one end, an endless, flexible conveyor disposed within said housing with a lower stretch disposed above and parallel to said bottom wall including said inclined portion of said bottom wall, said conveyor having perforate plates spaced apart along the same and extending normal to the direction of travel of the conveyor in said lower stretch and into close proximity to the sides and bottom walls of said housing including said inclined portion, whereby said plates on the lower stretch of said conveyor will form with the lower part of the housing a plurality of compartments arranged in succession along the lower part of said housing and up said inclined bottom portion, means for discharging particles to be treated for extraction into that end of said housing which is opposite the end with the inclined bottom whereby when said conveyor moves in a direction to carry its lower stretch toward the inclined end and along the bottom thereof, said particles will fill said compartments in succession and said filled compartments will move along the bottom of said housing and then up said inclined portion, said housing having a discharge opening at the upper end of said inclined bottom, whereby the particles may be discharged by gravity from said compartments as they reach the upper end of said inclined bottom wall, means for moving said conveyor by increments, with intervals of rest between said movements, means including stirrer members disposed above the path of travel of said plates with said lower stretch of the conveyor, movable in a direction crosswise of the direction of movement of said conveyor downwardly into and out of some of said compartments of said lower stretch and immovable in the direction of movement of said conveyor for stirring the particles in said compartments entirely locally for each compartment and in direction crosswise of the direction of travel of said compartments, at different positions of said compartments in their travel along the bottom of said housing, and means for passing a solvent liquid through the lower part of said housing at a level below the upper end of said inclined bottom.

4. Solvent extraction apparatus comprising a housing having a liquid-tight lower portion, an endless conveyor within said housing and having a lower stretch extending within and along said lower portion, above, parallel to, and spaced from the bottom of said housing, said conveyor having plates extending therefrom in a direction approximately normal to the direction of movement of the conveyor and of a size to move along and in close proximity to the bottom and side walls of the housing in said lower portion, means for circulating a solvent through said lower portion of said housing, a shaft extending above the upper edges of the plates carried by the lower stretch of the conveyor and having arms thereon rotating, upon rotation of said shaft, to move into and out of the compartments between adjacent plates and agitate and stir the particles in the compartments, and means for rotating said shaft in coordinated relation to the travel of said conveyor to prevent collisions of said arms and plates.

5. Solvent extraction apparatus comprising a housing having a liquid-tight lower portion, an endless conveyor within said housing and having a lower stretch extending within and along said lower portion, above, parallel to, and spaced from the bottom of said housing, said conveyor having plates extending therefrom in a direction approximately normal to the direction of movement of the conveyor and of a size to move along and in close proximity to the bottom and side walls of the housing in said lower portion, means for circulating a solvent through said lower portion of said housing, a shaft extending above the upper edges of the plates carried by the lower stretch of the conveyor and having arms thereon rotating, upon rotation of said shaft, to move into and out of the compartments between adjacent plates and agitate and stir the particles in the compartments, and means for rotating said shaft in coordinated relation to the travel of said conveyor to prevent collisions of said arms and plates, said arms being in the nature of scoops which dip into the compartments between plates during their lower swing with said shaft.

6. Solvent extraction apparatus comprising a housing, means for circulating a solvent through the lower part of said housing, conveyor means within said housing and having perforate plates moving along the sides and bottom of said lower part of said housing and forming therewith a plurality of compartments, said plates being movable along said lower part progressively so as to cause progressive movement of said compartments through said lower part, means for moving said plates by increments with periods of rest therebetween, a shaft disposed above and along the path of travel of said plates, mounted for rotation, and having arms thereof movable downwardly into and upwardly from the compartments in succession as the latter move along said lower part, means for rotating said shaft, and control means cooperating with said shaft rotating means and said conveyor moving means for preventing movement of said compartments when movement of said plates is obstructed by arms depending into said compartments.

7. The continuous method of solvent extraction of a dissolvable component from solid particles, which comprises passing said particles in separate, individual charges progressively and in succession along a predetermined path, by increment of movement separated by periods of non-movement, passing an extraction solvent through said charges in succession in a selected sequence, and displacing said particles entirely within each charge relatively to each other, and separately from the other charges, in directions generally crosswise of said path of travel of said charges during said periods of non-movement along said path, whereby the degree of solvent extraction action on said particles will have uniformity throughout the charges and all particles in each charge will have substantially equivalent extraction treatment.

8. Solvent extraction apparatus comprising a housing having a water-tight lower portion and with its bottom wall rising at an incline toward and adjacent one end, an endless, flexible conveyor disposed within said housing with a lower stretch disposed above and parallel to said bottom wall including said inclined portion of said bottom wall, said conveyor having perforate plates spaced apart along the same and extending normal to the direction of travel of the conveyor in said lower stretch and into close proximity to the sides and bottom walls of said housing including said inclined portion, whereby said plates on the lower stretch of said conveyor will form with the lower part of the housing a plurality of compartments arranged in succession along the lower part of said housing and up said inclined bottom portion, means for charging particles to be treated for extraction into that end of said housing which is opposite the end with the inclined bottom whereby when said conveyor moves in a direction to carry its lower stretch toward the inclined end and along the bottom thereof, said particles will fill said compartments in succession and said filled compartments will move along the bottom of said housing and then up said inclined portion, said housing having a discharge opening at the upper end of said inclined bottom, whereby the particles may be discharged by gravity from said compartments as they reach the upper end of said inclined bottom wall, means for moving said conveyor by increments, with intervals of rest between said movements, means disposed above the path of travel of said plates with said lower stretch of the conveyor and immovable in the direction of movement of said conveyor for stirring the particles in said compartments at different positions of said compartments in their travel along the bottom of said housing, and means for passing a solvent liquid through the lower part of said housing at a level below the upper end of said inclined bottom.

GUY N. HARCOURT.

REFERENCES CITED

The following references are of record in the file of this patent:

UNITED STATES PATENTS

| Number | Name | Date |
|---|---|---|
| 2,107,537 | Jones | Feb. 8, 1938 |
| 2,111,360 | Cutting | Mar. 15, 1938 |
| 2,183,837 | Hamilton | Dec. 9, 1939 |
| 2,204,777 | Smith | June 18, 1940 |
| 2,227,605 | Swallin | Jan. 7, 1941 |
| 2,231,154 | Chesny | Feb. 11, 1941 |
| 2,264,390 | Levine | Dec. 2, 1941 |
| 2,276,298 | Frazier | Mar. 17, 1942 |
| 2,280,811 | Edhofer | Apr. 28, 1942 |
| 2,381,965 | Berry | Aug. 14, 1945 |